US012587936B2

(12) United States Patent
Balan et al.

(10) Patent No.:  US 12,587,936 B2
(45) Date of Patent:     Mar. 24, 2026

(54) CONDITIONAL HANDOVER

(71) Applicant: Nokia Technologies Oy, Espoo (FI)

(72) Inventors: Irina-Mihaela Balan, Munich (DE); István Z. Kovács, Aalborg (DK); Ping Yuan, Beijing (CN); Rafhael Medeiros De Amorim, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 464 days.

(21) Appl. No.: 18/044,495

(22) PCT Filed: Sep. 17, 2020

(86) PCT No.: PCT/CN2020/115968
§ 371 (c)(1),
(2) Date: Mar. 8, 2023

(87) PCT Pub. No.: WO2022/056786
PCT Pub. Date: Mar. 24, 2022

(65) Prior Publication Data
US 2024/0031903 A1     Jan. 25, 2024

(51) Int. Cl.
*H04W 36/00*        (2009.01)
*H04W 36/32*        (2009.01)
*H04W 36/36*        (2009.01)

(52) U.S. Cl.
CPC ..... *H04W 36/322* (2023.05); *H04W 36/0061* (2013.01); *H04W 36/00835* (2018.08); *H04W 36/362* (2023.05)

(58) Field of Classification Search
None
See application file for complete search history.

(56) References Cited

U.S. PATENT DOCUMENTS

2014/0038616 A1*    2/2014   Burbidge .......... H04W 36/0079
                                                                      455/442
2015/0094069 A1     4/2015   Gopal et al.
                             (Continued)

FOREIGN PATENT DOCUMENTS

CN          110493830 A      11/2019
CN          111526541 A       8/2020
                  (Continued)

OTHER PUBLICATIONS

"Introduction of NR mobility enhancement", 3GPP TSG-RAN WG2 Meeting #109 electronic, R2-2001749, Intel Corporation, Feb. 24-Mar. 6, 2020, 524 pages.
(Continued)

*Primary Examiner* — Idowu O Osifade
(74) *Attorney, Agent, or Firm* — Barta Jones, PLLC

(57)                ABSTRACT
Embodiments of the present disclosure relate to conditional handover. A method comprises: determining, at a first device, an ordered list of target cells for a second device to initiate handover to in order based at least in part on location-related data of the second device, the second device being served in a source cell of the first device; transmitting, to the second device, first information indicating the ordered list of target cells and radio configurations associated with each of the target cells; and causing second information indicating the ordered list of target cells to be transmitted to at least one third device serving target cells in the ordered list, to request allocation of resources for the handover by the at least one third device. In this way, a chain of target cells regarding future handover is determined in a predetermined order, which avoid multiple cells prepare for a same handover, thus reducing handover preparation latency and improving the service continuity.

9 Claims, 8 Drawing Sheets

(56) References Cited

U.S. PATENT DOCUMENTS

| | | | |
|---|---|---|---|
| 2020/0022042 A1 | 1/2020 | Yin | |
| 2020/0045601 A1* | 2/2020 | Pedersen ......... | H04W 36/00837 |
| 2021/0120458 A1* | 4/2021 | Koskela ........... | H04W 36/0016 |
| 2021/0250823 A1* | 8/2021 | Fujishiro .............. | H04W 36/08 |

FOREIGN PATENT DOCUMENTS

| | | |
|---|---|---|
| WO | 2020/029366 A1 | 2/2020 |
| WO | 2020/057732 A1 | 3/2020 |
| WO | 2020/087432 A1 | 5/2020 |
| WO | 2020/119621 A1 | 6/2020 |
| WO | 2020/139015 A1 | 7/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NG-RAN; Xn application protocol (XnAP) (Release 16)", 3GPP TS 38.423, V16.1.0 , Mar. 2020, pp. 1-334.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

"Msc-generator", Sourceforge, Retrieved on Apr. 5, 2023, Webpage available at : https://sourceforge.net/projects/msc-generator/.

Hoque et al., "HETNET neighbour handover cell list optimization based on cognitive programmed threshold response", 8th International Conference on Electrical and Computer Engineering, Dec. 20-22, 2014, pp. 402-405.

"IEEE 802.11", Wikipedia, Retrieved on Apr. 4, 2023, Webpage available at : https://en.wikipedia.org/wiki/IEEE 802.11.

International Search Report and Written Opinion received for corresponding Patent Cooperation Treaty Application No. PCT/CN2020/115968, dated Jun. 16, 2021, 9 pages.

"Improvements on HO Robustness in LTE", 3GPP TSG-RAN WG2 Meeting #104, R2-1817474, Agenda: 12.3.3, Apple Inc, Nov. 12-16, 2018, pp. 1-5.

Office action received for corresponding Chinese Patent Application No. 202080021907.X, dated May 10, 2023, 7 pages of office action and no page of translation available.

Partial European Search Report received for corresponding European Patent Application No. 20953644.0, dated May 17, 2024, 13 pages.

"Update of Handover use case and solution considering user-trajectory info in subclause 6.5", 3GPP TSG-SA5 Meeting #132e, S5-204401, Agenda: 6.6.3, Nokia, Aug. 17-28, 2020, 5 pages.

Extended European Search Report received for corresponding European Patent Application No. 20953644.0, dated Aug. 8, 2024, 12 pages.

Office action received for corresponding Chinese Patent Application No. 202080021907.X, dated Feb. 13, 2024, 5 pages of office action and no page of translation available.

* cited by examiner

100

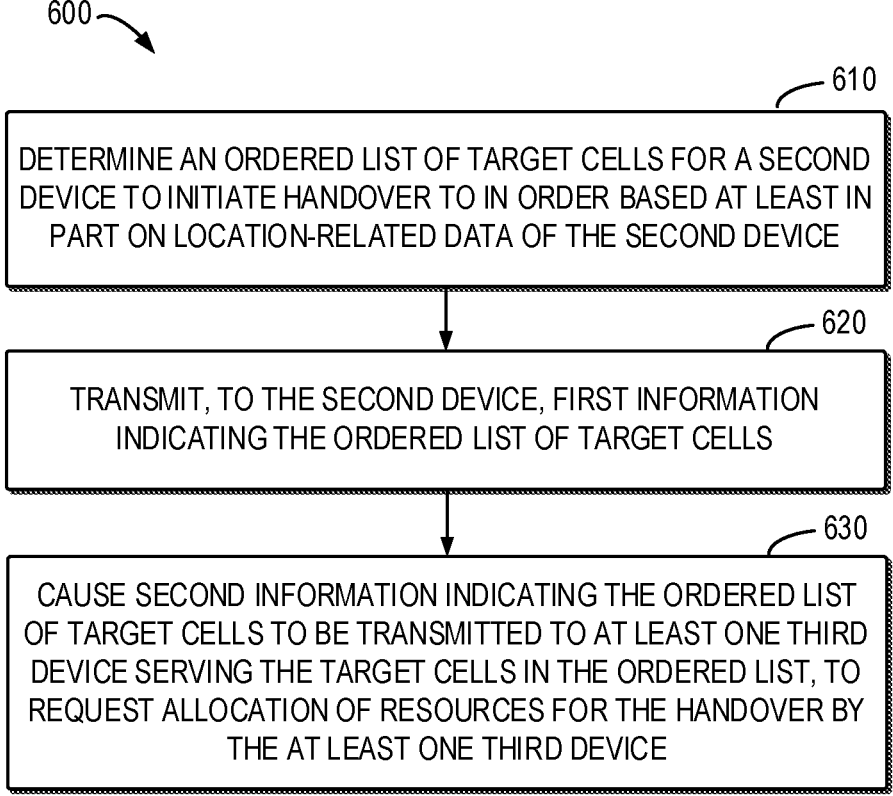

600

610

DETERMINE AN ORDERED LIST OF TARGET CELLS FOR A SECOND DEVICE TO INITIATE HANDOVER TO IN ORDER BASED AT LEAST IN PART ON LOCATION-RELATED DATA OF THE SECOND DEVICE

620

TRANSMIT, TO THE SECOND DEVICE, FIRST INFORMATION INDICATING THE ORDERED LIST OF TARGET CELLS

630

CAUSE SECOND INFORMATION INDICATING THE ORDERED LIST OF TARGET CELLS TO BE TRANSMITTED TO AT LEAST ONE THIRD DEVICE SERVING THE TARGET CELLS IN THE ORDERED LIST, TO REQUEST ALLOCATION OF RESOURCES FOR THE HANDOVER BY THE AT LEAST ONE THIRD DEVICE

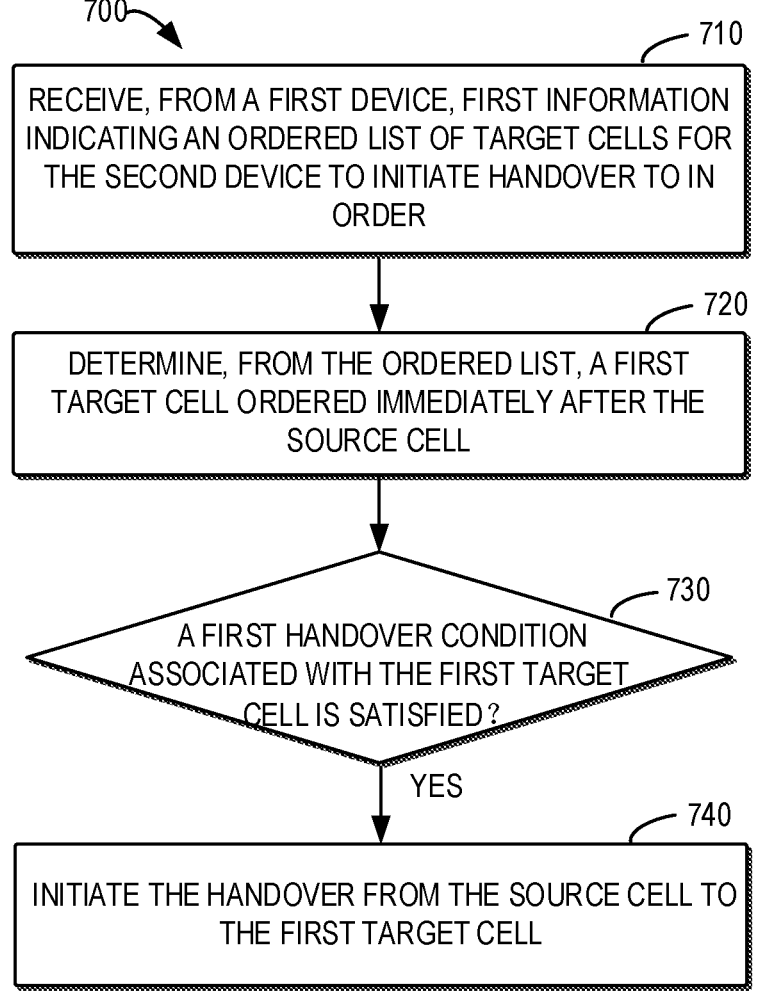

RECEIVE, FROM A FIRST DEVICE, FIRST INFORMATION INDICATING AN ORDERED LIST OF TARGET CELLS FOR THE SECOND DEVICE TO INITIATE HANDOVER TO IN ORDER

720

DETERMINE, FROM THE ORDERED LIST, A FIRST TARGET CELL ORDERED IMMEDIATELY AFTER THE SOURCE CELL

730

A FIRST HANDOVER CONDITION ASSOCIATED WITH THE FIRST TARGET CELL IS SATISFIED?

YES

740

INITIATE THE HANDOVER FROM THE SOURCE CELL TO THE FIRST TARGET CELL

RECEIVE SECOND INFORMATION INDICATING AT LEAST A PART OF AN ORDERED LIST OF TARGET CELLS FOR A SECOND DEVICE TO INITIATE HANDOVER TO IN ORDER

820

IN RESPONSE TO THE SECOND INFORMATION, ALLOCATE A RESOURCE FOR HANDOVER OF THE SECOND DEVICE

830

PERFORM THE HANDOVER OF THE SECOND DEVICE FROM A SOURCE CELL TO THE FIRST TARGET CELL USING THE ALLOCATED RESOURCE

900

930

1000

CONDITIONAL HANDOVER

RELATED APPLICATION

This application claims priority to PCT Application No. PCT/CN2020/115968 filed Sep. 17, 2020, which is incorporated herein by reference in its entirety.

FIELD

Embodiments of the present disclosure generally relate to the field of telecommunication and in particular, to methods, devices, apparatuses and computer readable storage media for conditional handover.

BACKGROUND

In mobile communication networks, the handover (HO) procedure is used to assure service continuity for mobile devices, such as terminal devices, user equipment (UE), a relay network device and so on. In the fifth generation (5G) (also referred to as new radio, NR) communication network, the following mechanism that is similar to the handover procedure in Long Term Evolution (LTE) is used for handover. Specifically, the terminal device measures cell quality in the radio cell environment. In a case that a neighbor cell quality is better than the source cell quality by a certain amount (e.g. Hysteresis) for a given amount of time, such as, the TimeToTrigger (TTT), the terminal device transmits a measurement report to a network device of the source cell for prompting the source cell to prepare handover to an indicated neighbor cell, that is, a target cell. The terminal device is then instructed via a handover command to attempt to connect to the target cell.

A conditional handover (CHO) procedure has been proposed to enhance the mobility robustness of the terminal devices. Specifically, the conditional handover is triggered when one or more preconfigured triggering conditions are determined to be satisfied at a terminal device. During the CHO procedure, more than one target cell may be prepared for a possible handover of the terminal device and the terminal device will only access one of the target cells.

SUMMARY

In general, example embodiments of the present disclosure provide a solution for conditional handover.

In a first aspect, there is provided a first device. The first device comprises at least one processor; and at least one memory including computer program code; the at least one memory and the computer program code are configured to, with the at least one processor, cause the first device to determine an ordered list of target cells for a second device to initiate handover to in order based at least in part on location-related data of the second device, the second device being served in a source cell of the first device; transmit, to the second device, first information indicating the ordered list of target cells; and cause second information indicating the ordered list of target cells to be transmitted to at least one third device serving the target cells in the ordered list, to request allocation of resources for the handover by the at least one third device.

In a second aspect, there is provided a second device. The second device comprises at least one processor; and at least one memory including computer program code, the at least one memory and the computer program code are configured to, with the at least one processor, cause the second device to: receive, from a first device, first information indicating an ordered list of target cells for the second device to initiate handover to in order, the second device being served in a source cell of the first device; determine, from the ordered list, a first target cell ordered immediately after the source cell; and in accordance with a determination that a first handover condition associated with the first target cell is satisfied, initiate the handover from the source cell to the first target cell.

In a third aspect, there is provided a third device. The third device comprises at least one processor; and at least one memory including computer program code, the at least one memory and the computer program code are configured to, with the at least one processor, cause the third device to: receive second information indicating at least a part of an ordered list of target cells for a second device to initiate handover to in order, the received part of the ordered list indicating at least a first target cell of the third device; in response to the second information, allocate a resource for handover of the second device; and perform the handover of the second device from a source cell to the first target cell using the allocated resource.

In a fourth aspect, there is provided a method. The method comprises: determining, at a first device, an ordered list of target cells for a second device to initiate handover to in order based at least in part on location-related data of the second device, the second device being served in a source cell of the first device; transmitting, to the second device, first information indicating the ordered list of target cells; and causing second information indicating the ordered list of target cells to be transmitted to at least one third device serving the target cells in the ordered list, to request allocation of resources for the handover by the at least one third device.

In a fifth aspect, there is provided a method. The method comprises: receiving, at a second device and from a first device, first information indicating an ordered list of target cells for the second device to initiate handover to in order, the second device being served in a source cell of the first device; determining, from the ordered list, a first target cell ordered immediately after the source cell; and in accordance with a determination that a first handover condition associated with the first target cell is satisfied, initiating the handover from the source cell to the first target cell.

In a sixth aspect, there is provided a method. The method comprises: receiving, at a third device, second information indicating at least a part of an ordered list of target cells for a second device to initiate handover to in order, the received part of the ordered list indicating at least a first target cell of the third device; in response to the second information, allocating a resource for handover of the second device; and performing the handover of the second device from a source cell to the first target cell using the allocated resource.

In a seventh aspect, there is provided a first apparatus. The first apparatus comprises: means for determining an ordered list of target cells for a second apparatus to initiate handover to in order based at least in part on location-related data of the second apparatus, the second apparatus being served in a source cell of the apparatus; means for transmitting, to the second apparatus, first information indicating the ordered list of target cells; and means for causing second information indicating the ordered list of target cells to be transmitted to at least one third apparatus serving the target cells in the ordered list, to request allocation of resources for the handover by the at least one third apparatus.

In an eighth aspect, there is provided a second apparatus. The second apparatus comprises: means for receiving, from a first apparatus, first information indicating an ordered list of target cells for the second apparatus to initiate handover to in order, the second apparatus being served in a source cell of the first apparatus; means for determining, from the ordered list, a first target cell ordered immediately after the source cell; and means for in accordance with a determination that a first handover condition associated with the first target cell is satisfied, initiating the handover from the source cell to the first target cell.

In a ninth aspect, there is provided a third apparatus. The third apparatus comprises: means for receiving second information indicating at least a part of an ordered list of target cells for a second apparatus to initiate handover to in order, the received part of the ordered list indicating at least a first target cell of the third apparatus; means for in response to the second information, allocating a resource for handover of the second apparatus; and means for performing the handover of the second apparatus from a source cell to the first target cell using the allocated resource.

In a tenth aspect, there is provided a non-transitory computer readable medium comprising program instructions for causing an apparatus to perform at least the method according to the above fourth aspect.

In an eleventh aspect, there is provided a non-transitory computer readable medium comprising program instructions for causing an apparatus to perform at least the method according to the above fifth aspect.

In a twelfth aspect, there is provided a non-transitory computer readable medium comprising program instructions for causing an apparatus to perform at least the method according to the above sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 6 illustrates a flowchart of a method implemented at a first device in accordance with some example embodiments of the present disclosure;

FIG. 7 illustrates a flowchart of a method implemented at a second device in accordance with some example embodiments of the present disclosure;

Throughout the drawings, the same or similar reference numerals represent the same or similar element.

DETAILED DESCRIPTION

Figure 1:
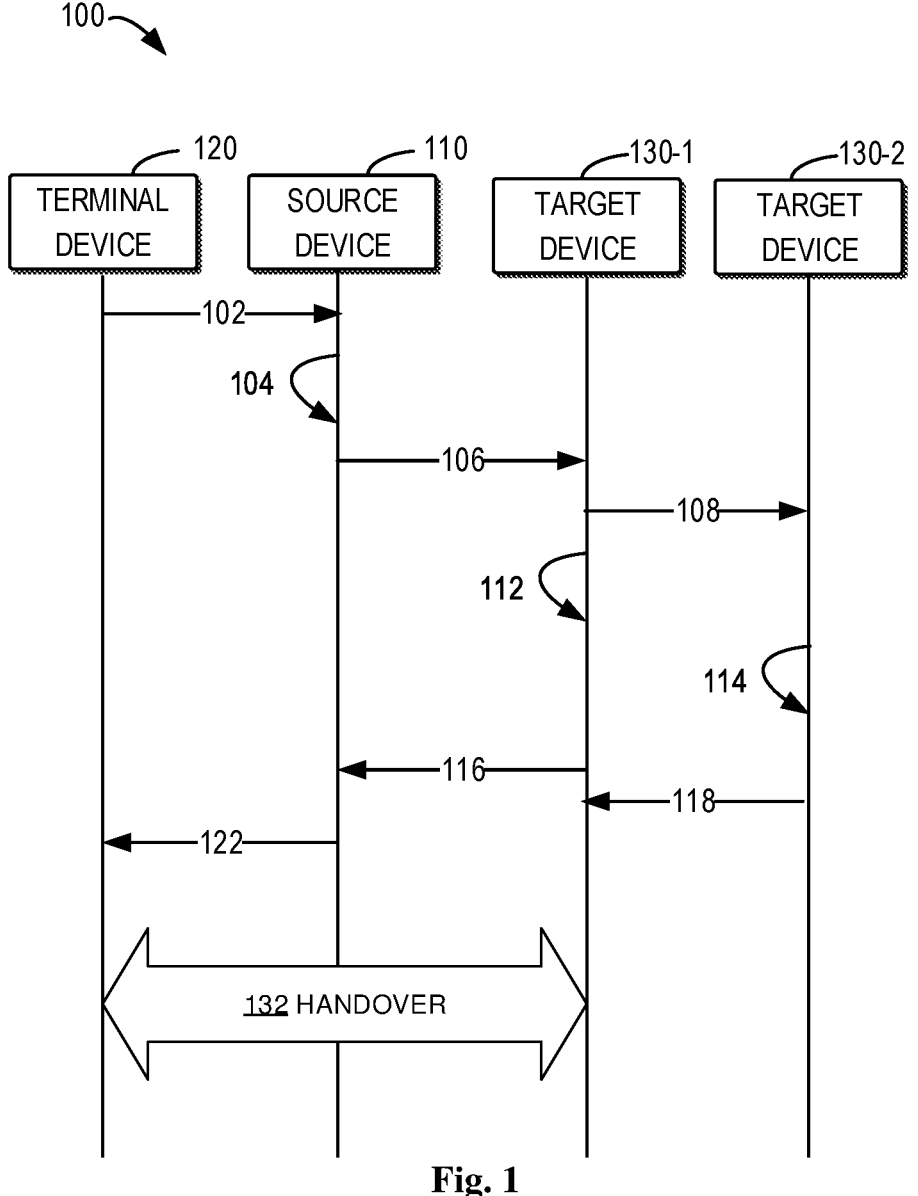
FIG. 1 shows a schematic diagram illustrating an example process of conditional handover.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
   (a) hardware-only circuit implementations (such as implementations in only analog and/or digital circuitry) and
   (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems, including but not limited to a terrestrial communication system, a non-terrestrial communication system or a combination thereof. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As discussed above, in the case that a neighbor cell quality is better than the source cell quality, a traditional handover procedure may be required. The network device of the source cell transmits a handover command to instructing the terminal device to switch from the source cell to a selected target cell. The terminal device then attempts to access the target cell and disconnects from the source cell, which results in an interruption of service. The network device of the source cell may forward data associated with the terminal device to the target cell. Once the terminal device has successfully connected to the target cell, the target cell transmits the data received from the source cell to the terminal device, and the interruption of service ends.

In a communication network, it is allowed for a network device, such as a gNB, to configure one or more target cells for handover of a single terminal device. FIG. 1 shows a schematic diagram illustrating an example process 100 of conditional handover. The process 100 may involve a source device 110, a terminal device 120, and target devices 130-1 and 130-2. In the example process 100, the terminal device 110 may comprise a UE, the source device 120 and target device 130-1 and 130-2 may be network device managing one or more cells.

As shown in FIG. 1, the source device 110 receives 102 a measurement report from the terminal device 120. Based on the measurement report, the source device 110 determines 104 that conditional handover for the terminal device 120 is required. The source device 110 prepares one or more target cells for of the target device 130-1 and 130-2 for the conditional handover. Specifically, the source device 110 transmits (106, 108) respective conditional handover requests to the corresponding target devices 130-1 and 130-2. Upon receiving the conditional handover requests, the target devices 130-1 and 130-2 respectively perform 112, 114 admission control for configuring required resources to be used for the possible handover. The target devices 130-1 and 130-2 then respectively transmit 116, 118 conditional handover request acknowledge messages to the source device 110. In response to the conditional handover request acknowledge messages, the source device 110 transmits 122 a RRC reconfiguration message to the terminal device 120, indicating the target cells of the target devices 130-1 and 130-2 as candidates for handover. In response to the RRC reconfiguration message, the terminal device 120 selects the target cell of the target device 130-1 and performs a handover procedure 132 from the source cell of the source device 110 to the selected target cell of the target device 130-1. The handover procedure 130 may involve interactions among the terminal device 120, the source device 110, and the target device 130-1.

Since the conditional handover can be prepared much earlier than the conventional handover, there is a higher risk that a wrong target cell is prepared and eventually cannot be accessed by the terminal device. In order to compensate for such uncertainty, typically more than one target cell is prepared for conditional handover. The source cell that is currently serving the terminal device is in charge of preparing conditional handover and the target cells are selected based on measurement reports received from the terminal device. Since only one conditional handover will eventually be executed, the rest of the target cells that are not selected will be deconfigured and the reserved resources will be released. As such, the triggering and preparation of conditional handover in advance comes at the cost of resources which are reserved for longer periods of time for one terminal device across multiple target cells.

As communication technologies have evolved to the 5G NR, the handover of terminal device may be performed within NR cells in a NTN provided by a NT network device, including but not limited to satellites, such as Low Earth Orbit (LEO) satellites, High Altitude Platforms (HAPS), Unmanned Aerospace Surveillance (UAS) platforms, and so on.

5G NR NTNs are fundamentally different than terrestrial access networks, and thus new mobility mechanisms and/or triggers may be needed to ensure good performance and minimize the service interruption for users. Some of the difference and challenges of the NTNs include:

the satellites providing the non-terrestrial network have deterministic satellite movement on pre-planned routes, and thus the coverage of the non-terrestrial network may largely be known in advance;

due to the relatively large signalling delays associated with the non-terrestrial network, handover of the terminal device within the non-terrestrial network needs to be prepared earlier or more in advance, which in turn increases the risk of outdated measurements;

due to the speed of satellites, it is unlikely for the terminal device to stay in the coverage of the non-terrestrial network for a long period of time, even if the terminal device is stationary, such as 6-132 s depending on the satellite footprint and the speed of the terminal device;

classic RSRP measurements used for triggering the conventional handover are tricky and less reliable; and the UL payload may be limited.

For conventional handover occurred in the NR communication network, the terminal device immediately accesses the target cell to complete the handover. Instead, for conditional handover, only when an additional conditional handover execution condition expires, that is, the handover preparation and execution phases are decoupled, will the terminal device access the target cell. The handover condition is typically configured, e.g. by the source node in a handover Command, and may include, but not limited to location-based condition, timer-based condition, timing advance-based condition, elevation angles of source and target cells-based condition, and so on. However, each of these handover conditions may present several disadvantages and challenges.

The advantage of the conditional handover is that the Handover command can be transmitted very early, for example, at the time when the terminal device is still safe in the source cell, without risking the access in the target cell and the stability of its radio link. In other words, conditional handover provides enhanced mobility robustness, but it is not helpful in reducing the interruption time associated with handover.

Figure 2:
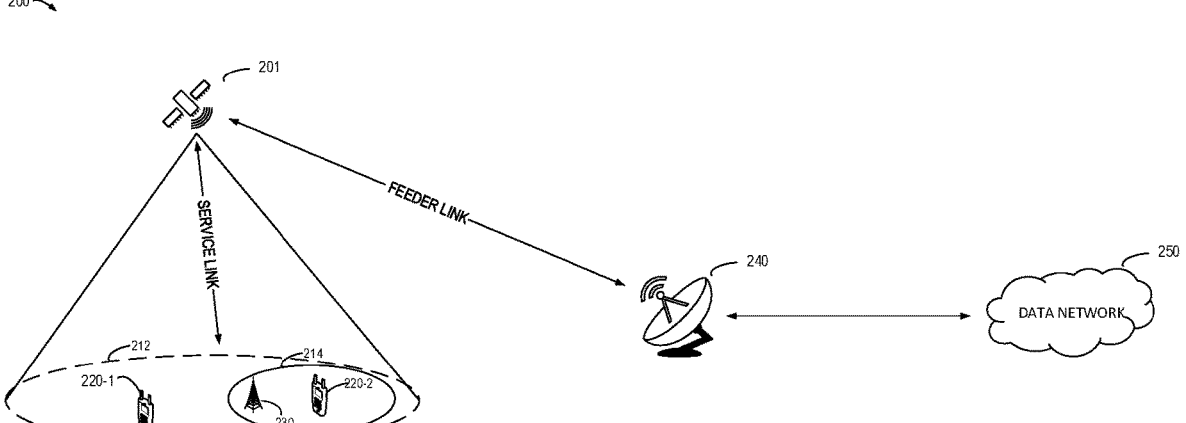
FIG. 2 illustrates an example communication environment in which embodiments of the present disclosure may be implemented.

FIG. 2 illustrates an example communication environment 200 in which embodiments of the present disclosure may be implemented. The example communication environment 200 may comprise a non-terrestrial (NT) network device 201, terminal devices 220-1 and 220-2, a terrestrial network device 230, a gateway device 240 and a data network 250.

In the communication environment 200, the NT network device 201 may be deployed at a satellite or a UAS platform and assumed to be able to generate beams (e.g., satellite beams) for providing the coverage. For example, one or more of the beams may be mapped to provide a serving area 212. There may be one or more cells within the serving area 212. The terrestrial network device 230 may comprise a base station, such as, gNB. The serving area of terrestrial network device 230 may be called a cell 214. The terminal devices 220-1 and 220-2 are respectively located within the serving area 212 and the cell 214.

The gateway device 240 may comprise a non-terrestrial network gateway and serve as a ground station or a fixed site on the Earth for connecting the NT network to the data network 250. The gateway device 240 may be configured to establish a feeder link to the NT network device 201.

In a case where the NT network device 201 is deployed at a Low/Medium Earth Orbit (e.g., LEO/MEO) satellite, the radio coverage footprint, i.e., the footprint of satellite beams may move together with the NT network device 201 and provide the Earth Moving cells (EMC). Alternatively, in another case, the radio coverage footprint may stay stationary relative to geographical locations and provide Earth Fixed cells (EFC).

In this embodiment, the NT network device 201 may have a transparent payload, because it acts as a relay for signals transmitted from the gateway device 240 and associated base station (e.g., gNB), to the terminal device 220 on the Earth. In some other embodiments, the NT network device 201 may have regenerative payload, for example, the gNB or gNB-DU is located on-board the NT network device.

For the NT network devices with EMCs, which move with a speed of 7.5 km/s along their orbit, the terminal device within the EMCs would be also perceived the cells, as the cells almost move with such a very high speed. This may result in very frequent intra-NT network device mobility events, even for stationary terminal devices, for example between a few seconds to a few 10 s of seconds depending on the exact orbit of the NT network device, beam footprint size, etc.

In accordance with some example embodiments of the present disclosure, there is provided a solution for adapting conditional handover to the non-terrestrial networks with mobility enhancements. More specifically, instead of repeatedly preparing more than one target cell for each conditional handover, a first device managing the source cell configures the terminal device with an ordered list of targets cells for indicating a chain of handover to be performed from one target cell to another. In other words, the ordered list may describe an estimated cell-trajectory of the terminal device associated with future handover.

Through this solution, the chain of target cells configuration replaces the traditional preparation phase for conditional handover (e.g. measurement reports), and several subsequent handovers can be prepared in advance. In addition, the initial chain of target cells configuration may be adjusted based on calibration checks and the executed handovers.

This solution is suitable for non-terrestrial networks, due to the deterministic nature of the coverage and assuming the geo-location (at cell or better level) of the terminal device is known at the network side. The solution may address the LEO use case, both scenarios when both the source cell and the target cell belong to the same NT network device or to different NT network devices, which will be described below in details in connection with FIGS. 3A and 3B. However, the proposed solution could also be applicable for other scenarios, such as a vehicle in a highway or a train, as well as some HAPS scenarios. It is to be understood that the solution is also suitable for terrestrial networks.

Example embodiments of the present disclosure will be described in detail below with reference to the accompanying drawings. Principle and embodiments of the present disclosure will be described in detail below with reference to the accompanying drawings.

Figure 3A:
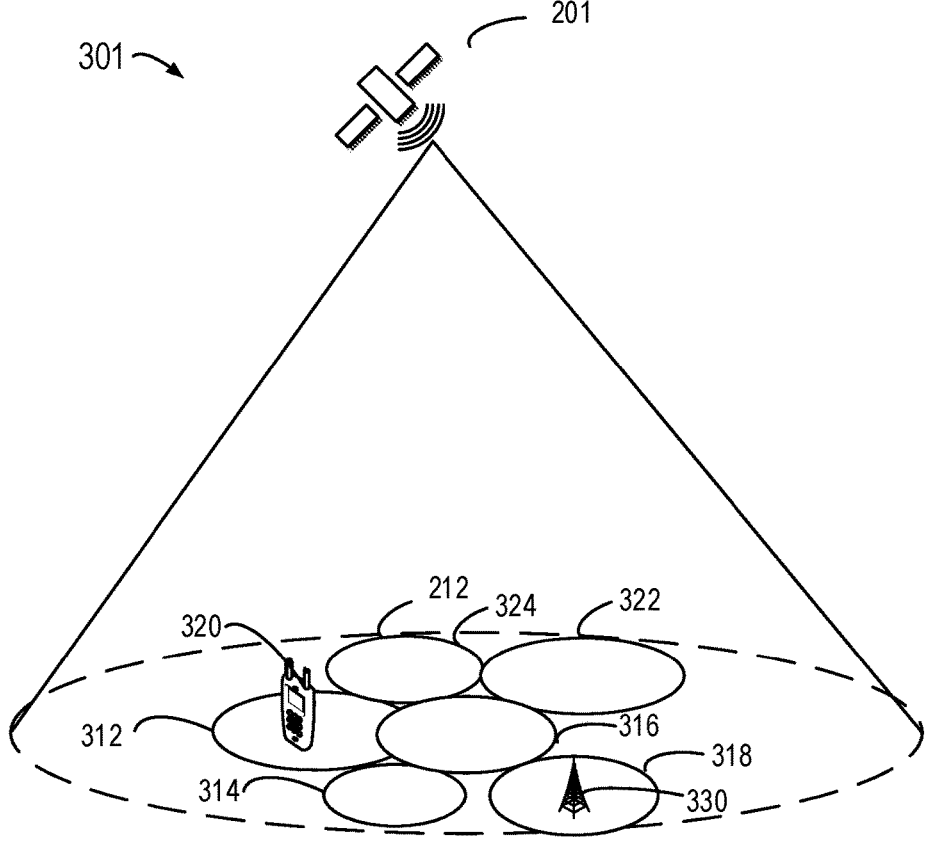
FIG. 3A illustrates an example communication network in which embodiments of the present disclosure may be implemented.

Reference is first made to FIG. 3A, which illustrates an example implementation of the NTN 301 of the communication environment 200. As shown in FIG. 3A, the communication network 301 includes a NT network device 201, a second device 320, and a third device 330.

In the example of FIG. 3A, the NT network device 201 may be a satellite, for example, the LEO satellite as described above. The NT network device 201 provides the coverage 212 with a plurality of cells 312, 314, 316, 322 and 324. The third device 330 provides a serving area, i.e., the cell 318. As shown in FIG. 3A, the second device 320 is serving by the cell 312, and a first device (not shown) managing the cell 312 may comprise one of at least a part of a terrestrial network device, and at least a part of a NT network device, for example, deployed at the NT network device 201. The third device 330 is illustrated as network devices serving the terminal devices.

The second device 320 is illustrated as terminal device. As discussed above, the handover between the plurality of cells 312-324 may be frequently initiated for the second device 320, which may also be referred to as intra-NT network device handover between cells under the coverage of a single NT network device. In some example embodiments, the NT network device 201 may include a LEO satellite.

Figure 3B:
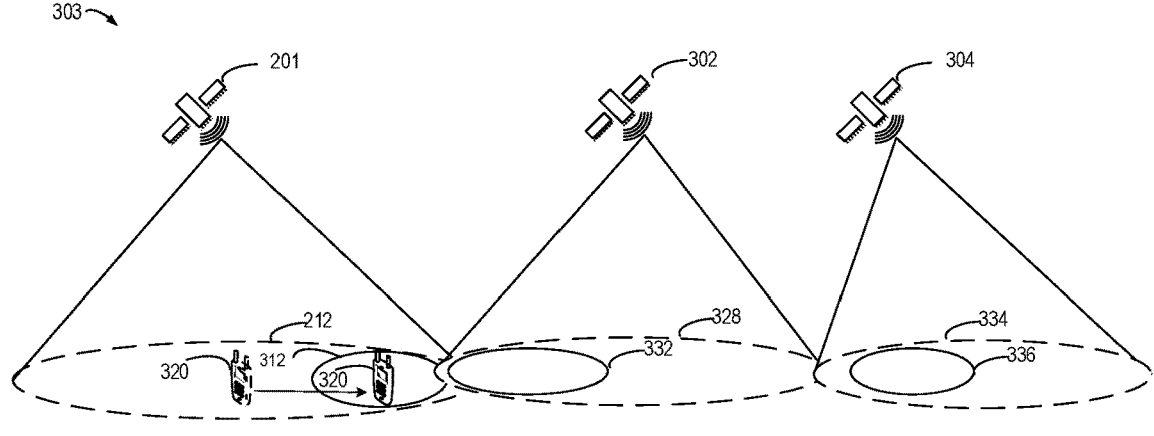
FIG. 3B illustrates an example communication network in which embodiments of the present disclosure may be implemented.

For the NT network devices with EFCs, the mobility events are less frequent as they are mostly triggered for inter-NT network devices handovers. FIG. 3B illustrates an example communication network 303 in which embodiments of the present disclosure may be implemented illustrates. As shown in FIG. 3B, the communication network 303 includes more than one NT network devices 201, 302 and 304, a second device 320. The network devices 201, 302 and 304 may be satellites, each provides a corresponding coverage 212, 328 and 334. As discussed above, there may be cells within the coverage of the NT network devices, for example, the cells 312, 322 and 336.

As shown in FIG. 3B, the second device 320 is initially located in the center of the coverage 212 of the NT network device 201. As the second device 320 moves towards the edge of the coverage 212, it is located within the cell 312 and handover between the cell 312 of the NT network device 201 and the cell 332 of the NT network device 302 may be initiated for service continuity of the second device 320. Subsequently, as each of the second device 320 and the NT network device 302 or both moves, a handover to the cell 336 of the NT network device 304 may be imitated in an analogous manner. In this case, the handover may also be referred to as inter-NT network devices handover between cells under coverage of different NT network devices.

In the examples shown in FIGS. 3A and 3B, the NT network devices are illustrated as satellites in the non-terrestrial network scenario, and the third device 330 is illustrated as a terrestrial network device serving the terminal devices. However, it would be appreciated that the NT network devices, first device and third device may comprise any other types of network device. It is noted that the terms "first device", "second device" and "third device" are used for ease of description only.

It is to be understood that the number of network devices, terminal devices and/or cells is given for the purpose of illustration without suggesting any limitations to the present disclosure. Each of the communication networks 301 and 303 may include any suitable number of network devices, terminal devices and/or cells adapted for implementing implementations of the present disclosure. Although not shown, it would be appreciated that one or more additional devices may be located in the cells 312 to 336, and one or more additional cells may be deployed in the communication networks 301 and 303. It is noted that although illustrated as network devices, the first device and/or third device 330 may be other device than a network device or a part of a network device, for example, at least a part of a terrestrial network device or a non-terrestrial network device. Although illustrated as a terminal device, the second device 320 may be other devices than terminal devices, such as a relay network device.

In the communication networks 301 and 303 as shown in FIGS. 3A and 3B, corresponding NT network devices 201, 302 and 304 and the third device 330 can communicate data and control information to the second device 320 and the second device 320 can also communication data and control information to the corresponding NT network devices 201, 302 and 304. A link from the first device or the third device 330 to the second device 320 is referred to as a downlink (DL), while a link from the second device 320 to the first device or the third device 330 is referred to as an uplink (UL). In DL, the first device or the third device 330 is a transmitting (TX) device (or a transmitter) and the second device 320 is a receiving (RX) device (or a receiver). In UL, the second device 320 is a TX device (or a transmitter) and the first device or the third device 330 is a RX device (or a receiver).

Communications in the communication networks 301 and 303 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In terms of the mobility of the terminal device, there are several aspects to be concerned, including intra-NT network device handover, inter-NT network devices handover, feeder link switch, fast moving cells, etc. So far, most of the proposals rely on a combination of radio measurements at UE side combined with UE location information, satellite ephemeris information, and the use of hand-over triggers based on timing advance variations/matching, path loss or distance estimations, elevation angle estimations.

Figure 4:
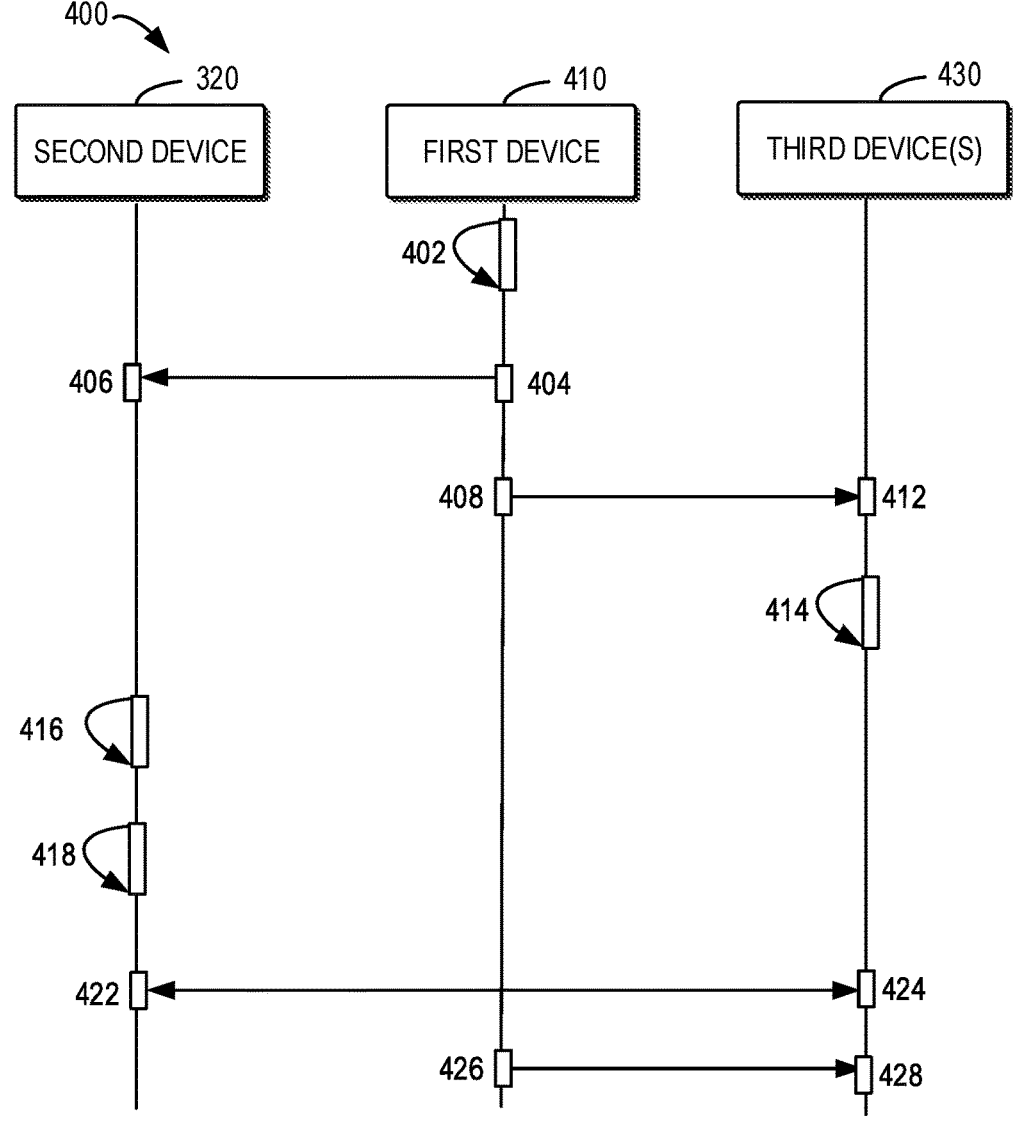
FIG. 4 illustrates a signaling flow for conditional handover in accordance with some example embodiments of the present disclosure.

To better understand the conditional handover procedure proposed in the disclosure, reference is now made to FIG. 4, which illustrates a signaling flow 400 for conditional handover in accordance with some example embodiments of the present disclosure. For the purpose of discussion, the signaling flow 400 will be described with reference to FIG. 3A. The signaling flow 400 may involve a first device 410, the second device 320 as illustrated in FIG. 3A and one or more third devices 430. It is to be understood that the process 400 is also applicable to the communication network 303 as shown in FIG. 3B and other suitable communication networks whether currently existing or later developed.

The cell 312 of the first device 410 is serving the second device 320, that is, the cell 312 acts as a source cell of the second device 320. Potential handover may occur between cells 312 to 324 of the first device 410 and the third device 430. As described above, the network device managing the source cell takes in charge of handover among multiple cells in conational handover.

In the signaling flow 400, the first device 410 determines 402 an ordered list of target cells for the second device 320 to initiate handover to in order based at least in part on location-related data of the second device 320. The ordered list may indicate a handover chain for specifying a plurality of target cells. The second device 320 may subsequently initiate handover in such order. By way of example, the first device 410 may estimate, based on location-related data of the second device 320, a cell-trajectory of cell 312→cell 314→cell 316→cell 318→cell 322 for future handover of the second device 320. In this case, the target cells comprise the cells 312 to 322.

In some example embodiments, the first device 410 may determine the ordered list of the target cells further based on coverage information indicating respective coverage areas of the source cell and the target cells as a function of time. In some other example embodiment, the first device 410 may determine the ordered list of the target cells further based on corresponding types of traffic expected by the second device within the target cells.

At this point, the mobility of the second device 320 may be handled by conventional handover or conditional handover mechanisms, and the information regarding mobility (e.g., mobility history of the second device 320 maintained at the second device 320 or at the network 301 side) may be also used for adjusting the ordered list.

The first device 410 transmits 404 first information indicating the ordered list of target cells 312 to 322 to the second device 320. In some example embodiments, the first device 410 may transmit the first information in a radio resource control reconfiguration message to the second device 320.

In some example embodiments, the first information may further include radio configurations associated with each of the target cells 312 to 322 in the ordered list for the second device 320 to initiate handover to a corresponding target cell in order.

In a case where the second device 320 is in the CONNECTED mode, the second device 320 may then perform handover between the target cells 312 to 322 following the order with less signaling required. Alternatively, in a case where the second device 320 is in the IDLE mode or INACTIVE mode, the cell reselection and paging process for the second device 320 in the communication network 301 may be speed up by means of the first information.

In some example embodiments, the first device 410 may cause handover timing information to be transmitted to the at least one third device 430. The handover timing information may comprise respective time indications of when the second device 320 is expected to be located within the target cells in the ordered list.

The second device 320 receives 406, from the first device 410, the first information indicating an ordered list of target cells 312 to 322 for the second device 320 to initiate handover to in order. In some example embodiments, the first information may be included in a RRC Reconfiguration message.

In some example embodiments, the first information may further include radio configurations associated with each of the target cells 312 to 322 for the second device 320 to initiate handover to a corresponding target cell in order. The radio configurations may also indicate data/signal resource bears associated with each of the target cells 312 to 322.

In some example embodiments, the first device 410 that act as a source device managing the first cell listed in the ordered list may transmit initial radio configurations associated with each of the target cells 312 to 322 in the ordered list by using full configurations in a handover command.

In some example embodiments, before each handover of the second device 320, a corresponding device that act as the source device managing a current source cell may transmit additional and latest radio configurations to the second device 320 by using delta configurations in the handover command. In such cases, the additional radio configurations may be associated with the upcoming handover from the current source cell to the target cell immediately adjacent to the current source cell in the ordered list.

The first device 410 causes 408 second information indicating the ordered list of target cells 312 to 322 to be transmitted to at least one third device 430 serving the target cells in the ordered list, to request allocation of resources for the handover by the at least one third device 430. In some example embodiments, the first device 410 may transmit the second information to each third device 430. The second information may comprise a handover request.

Upon receiving 412 the second information, the third device 430 allocates 414 a resource for handover of the second device 320. In some example embodiments, the third device 430 may allocate the resource for the handover based on the handover timing information. In the example embodiment, the target cell 314 of the third device 430 is the target cell ordered immediately after the source cell 312 in the list.

In some other example embodiments, the second device 320 may receive the second information from a fourth device in a second target cell in the ordered list. In this case, the second target cell may be ordered ahead of the first target cell in the ordered list.

The second device 320 determines 416 from the ordered list, a first target cell ordered immediately after the source cell 312. In this case, the first target cell may be the cell 314 of third device 430. The second device 320 determines 418 whether a first handover condition associated with the first target cell 314 is satisfied.

In some example embodiments, the first device 430 may transmit initial configuration information to the second device 320. The configuration information may include one or more handover condition for triggering handover for each pair of immediately adjacent target cells in the ordered list to the second device 320. The handover condition may be based on locations of the second device 320, the Received Signal Reference Power (RSRP) threshold, a timer, and so on. As an example, the configuration information may configure the first handover condition to be applied by the second device in handover from the source cell to the first target cell. As another example, the configuration information may configure at least one further handover condition to be applied by the second device in handover between at least one pair of immediately adjacent target cells in the ordered list.

If the first handover condition is satisfied, the second device 320 initiate 422 the handover from the source cell 312 to the first target cell 314. In some example embodiments, the second device 320 may perform handover to the first target cell 314 via random access channel (RACH) preamble.

The third device 430 performs 424 the handover of the second device 320 from the source cell 312 to the first target cell 314 using the allocated resource. If the handover is successful, the first device 410 may forward 426 data associated with the second device 320 (e.g., U-plane data) from the source cell 312 to the first target cell 314. The third device 430 receives 428 the data from first device 410.

After the handover to the first target cell is successful, the second device 320 may determine, from the ordered list, a list of target cells from a third device. The further ordered list being different from the ordered list. The second device 320 may perform further handover of the second device 320 based on the further ordered list of target cells.

As such, the data forwarding between the source cell 312 and the first target cell 314 may start early, and as soon as the second device 320 enters a new target cell, that target cell can perform dual casting to the second device 320 and to the next target cell in the list in order to achieve service continuity.

To understand the Radio Resource Control (RRC) signaling proposed in the present disclosure, an example of RRC reconfiguration message according to some embodiments of the present disclosure is illustrated below. The conditional handover chain (re)configuration can be signalled to the second device 220 via the RRCRecofiguration message. In some example embodiments, the ordered list may be indicated in a modified version of CondConfigToAddModList-r16 or in a new IE CondConfigToAddModListChainCHO (ASN.1 code example below) in the ConditionalRecofiguration IE. Each of target cells in the ordered list is a target cell that the second device 320 is supposed to access in order in the future.

```
CondConfigToAddModListChainCHO::=                    SEQUENCE (SIZE (1.. maxNrofCondCellsChainCHO)) OF
CondConfigToAddModChainCHO % ordered list of CHO targets (CHO chain)
CondConfigToAddModChainCHO ::=                        SEQUENCE {
    condConfigChainCHOId                                 CondConfigChainCHOId, % ID of CHO
    condExecutionCond-r16                                SEQUENCE (SIZE (1..2)) OF MeasId    OPTIONAL,    -- Need S%
execution condition
        condRRCReconfig-r16                                  OCTET    STRING                  (CONTAINING
RRCReconfiguration)                            OPTIONAL,    -- Need S
    condConfigChainCHO_timewindow_min                    timeReferenceSFN-rel16          OPTIONAL
        condConfigChainCHO_timewindow_max                    timeReferenceSFN-rel16          OPTIONAL
    ...
}
% identifies a CHO for part of a CHO chain
CondConfigChainCHOId::=                               INTEGER (1.. maxNrofCondCellsChainCHO)
% maximum length of CHO chain list
maxNrofCondCellsChainCHO = 10;
``` second target cell ordered immediately after the first target cell. In a case that a second handover condition associated with the second target cell is satisfied, handover from the first target cell to the second target cell may be initiated. In some example embodiments, the second handover condition may be the same with the first handover condition.

In some example embodiments, the third device 430 that acts as the source device managing the current source cell may determine further radio configurations associated with at least one of the target cells for the second device 320 to initiate further handover to a corresponding target cell in order. In such cases, the third device 430 may transmit supplementary information indicating the further radio configurations to the second device 320. The further radio configurations may be different from radio configurations configured with the second device 320, or alternatively different from the radio configurations in the first information.

Upon receipt the supplementary information from the third device 430, the second device 320 may override the radio configurations configured at the second device 320. In the above embodiments, the second device the second device 430 may perform the further handover based at least in part on the further radio configurations.

Figure 5:
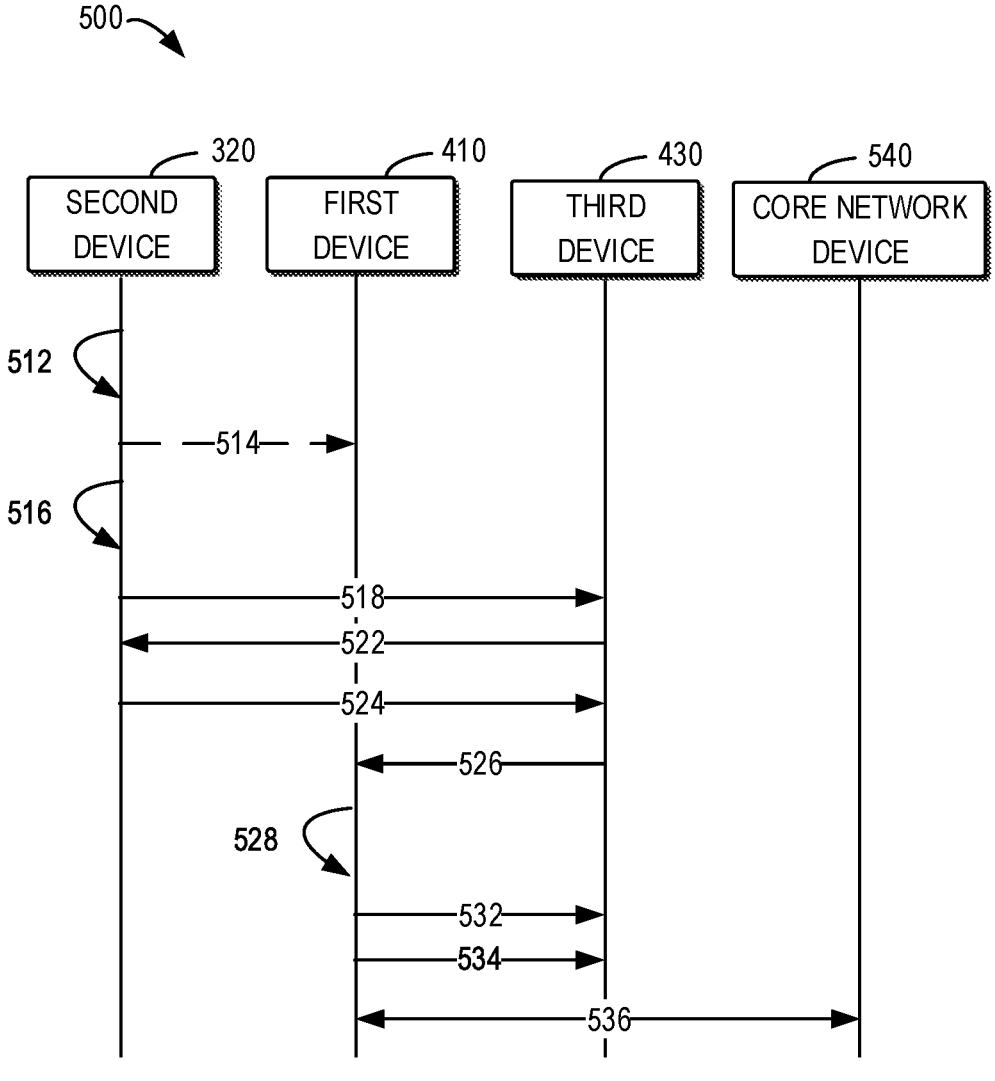
FIG. 5 illustrates a diagram illustrating a signaling flow of example conditional handover from a source cell to a target cell in which embodiments of the present disclosure may be implemented.

In some example embodiments, the second device 320 may receive third information indicating a further ordered FIG. 5 illustrates a diagram illustrating an example process 500 of conditional handover in which embodiments of the present disclosure may be implemented. More specifically, the process 500 shows example implementation of handover of the second device 320 from the source cell 312 to the first target cell 314 as show in FIG. 4. The process 500 may involve the first device 410, the second device 320, the third devices 430, as illustrated in FIG. 4 and a core network device 540. The core network device 540 may comprise a serving gateway (S-GW) with user plane function (UPF) and a mobility management element (MM) or access and mobility management function (AMF). It is to be understood that the process 500 is also applicable to the communication networks 200, 301 and 303 as shown in FIGS. 2, 3A and 3B as well as other suitable communication networks whether currently existing or later developed.

The second device 320 evaluates 512 the first handover condition associated with the first target cell 314. At this point, the second device 320 may still transmit 514 user data to the first device 410. If the first handover condition is satisfied, the second device 320 stops 516 transmitting and receiving data from the first device 410. The second device transmits 518 a PRACH preamble to the third device 430. Upon receiving the PRACH preamble, the third device 430 transmits 522 a RACH response to the second device 320. When the second device 320 has successfully accessed first target cell, the second device 320 transmits 524 RRCReconfiguration complete message to the third device 430. Upon receiving the RRCReconfiguration complete message, the third device 430 transmits 526 a handover success message to the first device 410 indicating that the handover procedure is completed for the second device 320. In response to the handover success message, the first device 410 stops 528 transmitting and receiving data from the second device 320. The first device 410 performs 532 the sequence number (SN) status transfer with the third device 430 and forwards 534 data received from the second device 320 during the handover procedure to the third device 430. The path switch is then performed 536 between the first device 410 and the third device 430 via the core network device 540.

The signaling among the devices involved in the conditional handover proposed herein is described above. To better understand the example embodiments of the present disclosure, example processes will be described below from the perspective of the individual devices.

FIG. 6 shows a flowchart of an example method 600 according to some example embodiments of the present disclosure. The method 600 can be implemented at a device e.g. at the first device 410 as shown in FIG. 4. For the purpose of discussion, the method 600 will be described with reference to FIGS. 3A and 4. It is to be understood that the method 600 is also applicable to the communication network 303 as shown in FIG. 3B and other suitable communication networks whether currently existing or later developed.

At block 610, the first device 410 determines an ordered list of target cells for the second device 320 to initiate handover to in order based at least in part on location-related data of the second device 320. In this embodiment, the second device 320 is served in a source cell of the first device 410.

In some example embodiments, the location-related data may indicate at least one of a cell identity of the source cell 312, geo-location data of the second device 320, a velocity of the second device 320, a moving direction of the second device 320, and an estimated trajectory of the second device 320.

In some example embodiments, the first device 410 may obtain the location-related data of the second device 320, such as Global Positioning System data, sensor data and so on, from a location management function (LMF) of the communication network 301. In some other embodiments in which the second device 320 does not have positioning capabilities, the first device 410 may estimate at least one of the location, the velocity, or a future trajectory of the second device 320 based on the measurement report transmitted from the second device 320 and/or by using a network based fingerprinting method or a machine learning method whether currently existing or later developed.

In some example embodiments, in determining the ordered list, the first device 410 may further consider satellite ephemeris information, for example, the two-line orbital element, velocity, coordinates, timing, satellite identification associated with the NT network device 201.

In some example embodiments, the first device 410 may determine the ordered list of target cells further based on at least one of coverage information indicating respective coverage areas of the source and the target cells 312 to 324 as a function of time, and corresponding types of traffic expected by the second device 320 within the target cells. For example, compared to land-urban, suburban, rural areas, different type of movements or mobility of second device 320 may be allowed in the geographical area covered by the NT network device 201 (e.g., the radio footprint) such as, ocean, desert, forest and so on. For a further example, the ordered list may vary depending upon the type of second device 320, for example, stationary or mobile terminal devices, low-high speed terminal device (e.g., handheld devices), high-speed terminal devices (e.g., devices in a train, airplane and the like), and expected traffic in the geographical area, including but not limited to, Internet of Things (IoT) traffic, eMBB traffic, and so on. In some embodiments, the second device 320 may also be a relay network device for providing coverage with satellite backhaul.

In some example embodiments, the ordered list determined by the first device 410 may be an initial list of target cells for conditional handover. The length of the initial list may be variable and associated with a confidence level of the location and trajectory estimation for the second device 320. By way of example, the initial list may be relatively short. As the network devices, such as first device 410 and the third device 330, 430 or any other suitable network device of the communication network 301 gathers more information and data about the second device 320 and the confidence level of the location and trajectory estimation for the second device 320 also changes, the ordered list may then be adjusted to be longer or shorter accordingly.

In some example embodiments, the content and the size of the ordered list may be further based on historical information associated with the second device 320 mobility profile. The historical information may be collected by the network devices, such as first device 410 and the third device 330, 430 or any other suitable network device of the communication network 301 in given geographical area, for example, from similar locations.

In some example embodiments, the first device 410 may cause handover timing information to be transmitted to the at least one third device 430. In this case, the handover timing information may include respective time indications of when the second device 320 is expected to be located within the target cells in the ordered list.

At block 620, the first device 410 transmits, to the second device 320, first information indicating the ordered list of target cells. In some example embodiments, the first device 410 may transmit the first information in a radio resource control reconfiguration message to the second device 320.

In some example embodiments, the first information may further include radio configurations associated with each of the target cells in the ordered list for the second device 320 to initiate handover to a corresponding target cell in order. The radio configurations may also indicate data/signal resource bears associated with each of the target cells.

In some example embodiments, the first device 410 that act as a source device managing the first cell listed in the ordered list may transmit initial radio configurations associated with each of the target cells in the ordered list by using full configurations in a handover command.

In some example embodiments, the first device 410 may transmit the second information to the at least one third device 430. As an example, the second information may comprise a handover request message that is extended to include an information element indicative of the ordered list. Such an information element may be provided as part of the messages for basic mobility procedures over X2AP within a handover preparation procedure for establishing necessary resource in a corresponding third device for a coming handover.

In the above embodiment, the Target Cell Global ID information of the handover request message may be extended or complemented to indicate an ordered list of common gateway interface (CGI), for example, in form of range 1 . . . <maxnoofChainCells>, where the maxnoof-ChainCells indicates the length of the ordered list. In this case, the first CGI in the ordered list corresponds to the target cell where the handover request message is first transmitted by the source cell.

Alternatively, in some other embodiments, the second information indicating the ordered list may be included in a new IE of the handover request message.

At block 630, the first device 410 causes second information indicating the ordered list of target cells to be transmitted to at least one third device 430 serving the target cells in the ordered list, to request allocation of resources for the handover by the at least one third device 430. In some example embodiments, to cause the second information to be transmitted, the first device 410 may transmit the second information to the at least one third device 430. In some other embodiments, the first device 410 may transmit the second information in a handover request to the at least one third device 430.

In some example embodiments, the first device 410 or the NT network device 301 may transmit the ordered list and optionally other configuration information including handover timing information to all the target cells 314 to 322 in the ordered list, for example, by using full configuration in handover commands. Each time before handover, additional latest configuration information associated with the next handover may be transmitted to the second device 320, such as, delta configuration in handover commands. Once the second device 320 receives the additional configuration information, the second device 320 may override the old configuration information by the additional configuration information.

In some example embodiments, at least one of the first device 410 and the at least one third device 430 may include one of the following: at least a part of a terrestrial network device, and at least a part of a non-terrestrial network device. In some example embodiments, the second device 320 may include one of a terminal device and a relay network device.

FIG. 7 shows a flowchart of an example method 700 according to some example embodiments of the present disclosure. The method 700 can be implemented at a device e.g. at the second device 320 as shown in FIG. 3A. For the purpose of discussion, the method 700 will be described with reference to FIGS. 3A and 4. It is to be understood that the method 700 is also applicable to the communication network 303 as shown in FIG. 3B and other suitable communication networks whether currently existing or later developed.

At block 710, the second device 320 receives, from the first device 410, first information indicating an ordered list of target cells for the second device to initiate handover to in order. In this case, the second device 320 is served in a source cell of the first device 410.

In some example embodiments, the first information may further include radio configurations associated with each of the target cells in the ordered list for the second device 320 to initiate handover to a corresponding target cell in order.

At block 720, the second device 320 determines, from the ordered list, a first target cell ordered immediately after the source cell. If the first handover condition associated with the first target cell is satisfied, at block 730, the second device 320 initiates the handover from the source cell to the first target cell.

In some example embodiments, one or more handover condition including the first handover condition may be preconfigured for the second device 320 to trigger the handover procedure. In some example embodiments, one or more handover conditions may be event-based conditions, including but not limited to, measurement-based, location-based, time-based, elevation angles of source and target cells based and so on.

In some example embodiments, the handover to the first target cell is successful. In this case, the second device 320 may determine, from the ordered list, a second target cell ordered immediately after the first target cell. If a second handover condition associated with the second target cell is satisfied, the second device 320 may initiate handover from the first target cell to the second target cell. As described above, the second handover condition may include event-based conditions and be preconfigured by the network. In some example embodiments, the second handover condition may or may not be the same as the first handover condition.

In some example embodiments, the second device 320 may receive, from the third device 430, supplementary information indicating further radio configurations associated with at least one of the target cells. The further radio configurations may be different from the radio configurations in the first information. Upon receipt the supplementary information, the second device 320 may override old radio configurations kept at the second device 320. In such cases, the second device 320 may perform further handover based on the further radio configurations.

In some example embodiments, the second device 320 may receive third information indicating a further ordered list of target cells from a third device. In this case, the second device 320 may perform further handover of the second device based on the further ordered list of target cells. In some example embodiments, the further ordered list may be different from the ordered list.

In some example embodiments, the second device 320 may receive, from the first device 410, configuration information to configure the first handover condition to be applied by the second device 320 in handover from the source cell to the first target cell. In some other example embodiments, the second device 320 may receive, from the first device 410, configuration information to configure at least one further handover condition to be applied by the second device 320 in handover between at least one pair of immediately adjacent target cells in the ordered list, for example, any two target cells immediately adjacent in the chain of target cells 312-314-316-318-322-324.

Figure 8:
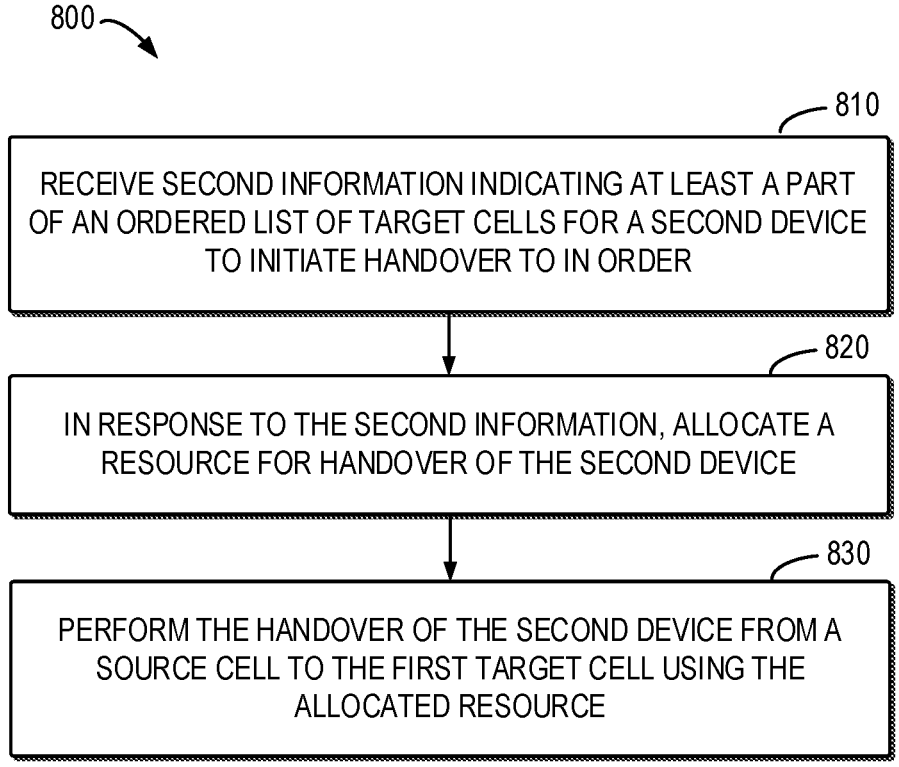
FIG. 8 illustrates a flowchart of a method implemented at a third device in accordance with some example embodiments of the present disclosure.

FIG. 8 shows a flowchart of an example method 800 according to some example embodiments of the present disclosure. The method 800 can be implemented at a device e.g. at the third device 430 as shown in FIG. 4. For the purpose of discussion, the method 800 will be described with reference to FIGS. 3A and 4. It is to be understood that the method 800 is also applicable to the communication network 303 as shown in FIG. 3B and other suitable communication networks whether currently existing or later developed.

At block 810, the third device 430 receives second information indicating at least a part of an ordered list of target cells for a second device to initiate handover to in order. The received part of the ordered list may indicate at least a first target cell of the third device 430. The second information may include handover request transmitted from the source cell.

In some example embodiments, the third device 430 may receive the second information from the first device 410 in the source cell or from a fourth device in a second target cell in the ordered list. In this case, the second target cell is ordered ahead of the first target cell in the ordered list.

At block 820, the third device 430 allocates, in response to the second information, a resource for handover of the second device 320. In some example embodiments, the third device 430 may receive handover timing information comprising respective time indications of when the second device 320 is expected to be located within the target cells in the ordered list. In this case, the third device 430 may allocate the resource for the handover based on the handover timing information.

In some example embodiments, the third device 430 may receive handover timing information comprising respective time indications of when the second device 320 is expected to be located within the target cells 312 to 322 in the ordered list. In this case, the third device 430 may allocate the resource for the handover based on the handover timing information.

As described above with respect to FIG. 6, the second device may comprise the handover request from the first device 410. In this case, upon receiving the second information, the third device 430 may determine that whether the conditional handover is supported by the corresponding target cell. For example, if the conditional handover is supported by the first target cell 314, the third device 430 may transmit a handover request acknowledge message to the first device 410 for indicating the conditional handover is supported.

In some example embodiments, the third device 430 corresponding to targets cells 314 to 322 may then allocate random access Channel (RACH) resources for an expected time window to avoid wasting resources. In some example embodiments, the third device 430 may allocate dedicated RACH resources based at least in part on initial time information of the second device 320, e.g., system frame number (SFN) and the time indication of when the second device 320 will perform the handover to each of target cells. Additionally or alternatively, the third device 430 may be further configured to fallback to contention based random access in a case where the second device 320 misses the time window of contention free random access. As such, from the perspective of the second device 320, the handover to the first target cell 314 is still possible.

At block 830, the third device 430 performs the handover of the second device 320 from a source cell to the first target cell using the allocated resource.

In some example embodiments, the third device 430 may determine further radio configurations associated with at least one of the target cells for the second device 320 to initiate handover to a corresponding target cell in order. The further radio configurations may be different from radio configurations configured with the second device 320. In such cases, the third device 320 may transmit, to the second device 320, supplementary information indicating the further radio configurations. For example, the third device 430 may transmit the further radio configurations as delta configurations in the handover command.

In some example embodiments, the third device 430 may determine that handover of the second device 320 has deviated from the cell-trajectory indicated by the ordered list. For example, the second device 320 may initiate handover to a cell that is not in the ordered list. For another example, the second device 320 may skip one or more target cells in the ordered list. e.g. switching from source cell 312 directly to the target cell 316. In these cases, the adjustment on the ordered list and optionally the adjustment on handover timing information are required. Models for estimating geographical trajectory, velocity, location of the second device 320 may be also adjusted considering updated information available in the current serving cell and handover timing information of when each conditional handover was executed (e.g. early/late execution).

In this embodiment, the third device 430 may determine a further ordered list of target cells for the second device to initiate handover to in order. The further ordered list may be different from the ordered list. The third device 430 may transmit, to the second device 320, third information indicating the further ordered list of target cells. The third device 430 may cause fourth information indicating the further ordered list of target cells to be transmitted to at least one fourth device serving the target cells in the further ordered list.

In some example embodiments, the third device 430 may transmit corresponding fourth information to the at least one fourth device. In some other embodiments, the further ordered list or a corresponding part of the further ordered list may be propagated from one fourth device to another.

In some example embodiments, the third device 330 may cause deconfiguration information to be transmitted to at least one further third device serving at least one of the target cells that is included in the ordered list but excluded from the further ordered list. The deconfiguration information may indicate that the at least one target cell is de-configured for handover of the second device. In some example embodiments, the information may be included in condConfig-ToRemoveList-r16 IE of the RRCReconfiguration message. Upon receiving the information, the target cells 312 to 322 in the ordered list may be reconfigured and the allocated resource for conditional handover by the target cells may be released.

In some example embodiments, to determine the further ordered list, the third device 430 may determine whether the source cell is ordered immediately ahead of the first target cell in the ordered list. If the source cell is determined to be not ordered immediately ahead of the first target cell in the ordered list, the third device 430 may determine the further ordered list for the second device 320.

In some example embodiments, the third device 430 may determine the further ordered list based on at least one of location-related data of the second device 320, coverage information indicating respective coverage areas of the first target cell and the target cells as a function of time and corresponding types of traffic expected by the second device 320 within the target cells in the further ordered list.

In some example embodiments, an apparatus capable of performing the method 600 may comprise means for performing the respective steps of the method 600. The means may be implemented in any suitable form. For example, the means may be implemented in a circuitry or software module.

In some example embodiments, the first apparatus comprises: determining, at a first apparatus, an ordered list of target cells for a second apparatus to initiate handover to in order based at least in part on location-related data of the second apparatus, the second apparatus being served in a source cell of the first apparatus; means for transmitting, to the second apparatus, first information indicating the ordered list of target cells; and means for causing second information indicating the ordered list of target cells to be transmitted to at least one third apparatus serving the target cells in the ordered list, to request allocation of resources for the handover by the at least one third apparatus.

In some example embodiments, the means for determining the ordered list of target cells comprises: means for determining the ordered list of the target cells further based on at least one of the following: coverage information indicating respective coverage areas of the source cell and the target cells as a function of time, and corresponding types of traffic expected by the second apparatus within the target cells.

In some example embodiments, the first apparatus further comprises: means for causing handover timing information to be transmitted to the at least one third apparatus, the handover timing information comprising respective time indications of when the second apparatus is expected to be located within the target cells in the ordered list.

In some example embodiments, the means for causing the second information to be transmitted comprises: means for transmitting the second information to the at least one third apparatus.

In some example embodiments, the means for transmitting the first information comprises: means for transmitting the first information in a radio resource control reconfiguration message to the second apparatus.

In some example embodiments, the means for causing the second information to be transmitted comprises: means for transmitting the second information in a handover request to the at least one third apparatus.

In some example embodiments, at least one of the first apparatus and the at least one third apparatus comprises one of the following: at least a part of a terrestrial network device, and at least a part of a non-terrestrial network device, and the second apparatus comprises one of a terminal device and a relay network device.

In some example embodiments, an apparatus capable of performing the method 700 may comprise means for performing the respective steps of the method 700. The means may be implemented in any suitable form. For example, the means may be implemented in a circuitry or software module.

In some example embodiments, the second apparatus comprises: means for receiving, from a first apparatus, first information indicating an ordered list of target cells for the second apparatus to initiate handover to in order, the second apparatus being served in a source cell of the first apparatus; means for determining, from the ordered list, a first target cell ordered immediately after the source cell; and in accordance with a determination that a first handover condition associated with the first target cell is satisfied, initiating the handover from the source cell to the first target cell.

In some example embodiments, the handover to the first target cell is successful, and the second apparatus further comprises: means for determining, from the ordered list, a second target cell ordered immediately after the first target cell; and means for in accordance with a determination that a second handover condition associated with the second target cell is satisfied, initiating handover from the first target cell to the second target cell.

In some example embodiments, the second apparatus further comprises: means for receiving third information indicating a further ordered list of target cells from a third apparatus, the further ordered list being different from the ordered list; and means for performing further handover of the second apparatus based on the further ordered list of target cells.

In some example embodiments, the first information further comprises radio configurations associated with each of the target cells for the second apparatus to initiate handover to a corresponding target cell in order, and the second apparatus further comprises: means for receiving, from a third apparatus, supplementary information indicating further radio configurations associated with at least one of the target cells, the further radio configurations being different from the radio configurations in the first information; and means for performing further handover of the second apparatus based on the further radio configurations.

In some example embodiments, the second apparatus further comprises: means for receiving, from the first apparatus, configuration information to configure at least one of the following: the first handover condition to be applied by the second apparatus in handover from the source cell to the first target cell, and at least one further handover condition to be applied by the second apparatus in handover between at least one pair of immediately adjacent target cells in the ordered list.

In some example embodiments, an apparatus capable of performing the method 800 may comprise means for performing the respective steps of the method 800. The means may be implemented in any suitable form. For example, the means may be implemented in a circuitry or software module.

In some example embodiments, a third apparatus comprises: means for receiving second information indicating at least a part of an ordered list of target cells for a second apparatus to initiate handover to in order, the received part of the ordered list indicating at least a first target cell of the third apparatus; means for in response to the second information, allocating a resource for handover of the second apparatus; and means for performing the handover of the second apparatus from a source cell to the first target cell using the allocated resource.

In some example embodiments, the means for allocating the resource comprises: means for receiving handover timing information comprising respective time indications of when the second apparatus is expected to be located within the target cells in the ordered list; and means for allocating the resource for the handover based on the handover timing information.

In some example embodiments, the means for receiving the second information comprises: means for receiving the second information from a first device in the source cell or from a fourth apparatus in a second target cell in the ordered list, the second target cell being ordered ahead of the first target cell in the ordered list.

In some example embodiments, the third apparatus further comprises: means for determining further radio configurations associated with at least one of the target cells for the second apparatus to initiate handover to a corresponding target cell in order, the further radio configurations being different from radio configurations configured with the second apparatus; and means for transmitting, to the second apparatus, supplementary information indicating the further radio configurations.

In some example embodiments, the third apparatus further comprises: means for determining a further ordered list of target cells for the second apparatus to initiate handover to in order, the further ordered list being different from the ordered list; means for transmitting, to the second apparatus, third information indicating the further ordered list of target cells; and means for causing fourth information indicating the further ordered list of target cells to be transmitted to at least one fourth apparatus serving the target cells in the further ordered list.

In some example embodiments, the third apparatus further comprises: means for cause deconfiguration information to be transmitted to at least one further third apparatus serving at least one of the target cells that is included in the ordered list but excluded from the further ordered list, the deconfiguration information indicating that the at least one target cell is de-configured for handover of the second apparatus.

In some example embodiments, the means for determining the further ordered list comprise: means for determining whether the source cell is ordered immediately ahead of the first target cell in the ordered list; and means for in accordance with a determination that the source cell is not ordered immediately ahead of the first target cell in the ordered list, determining the further ordered list for the second apparatus.

In some example embodiments, means for determining the third apparatus is caused to determine the further ordered list based on at least one of the following: location-related data of the second apparatus; coverage information indicating respective coverage areas of the first target cell and the target cells in the further ordered list as a function of time and corresponding types of traffic expected by the second apparatus within the target cells in the further ordered list.

Figures 9, 10:
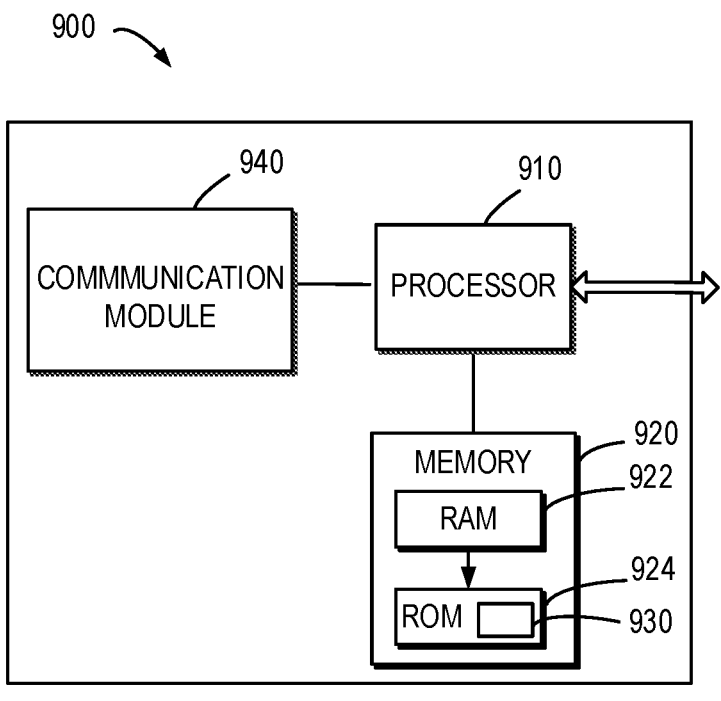
FIG. 9 illustrates a simplified block diagram of an apparatus that is suitable for implementing embodiments of the present disclosure.
FIG. 10 illustrates a block diagram of an example computer readable medium in accordance with some embodiments of the present disclosure.

FIG. 9 is a simplified block diagram of a device 900 that is suitable for implementing embodiments of the present disclosure. The device 900 may be provided to implement the communication device, for example the first device 410, the second device 320 and the third devices 330, 430 as shown in FIGS. 3A, 3B and 4. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 6 to 8. The embodiments of the present disclosure may also be implemented by hardware or by a combination of software and hardware.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 or 800 as described above with reference to FIGS. 6-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one memory including computer program code;
wherein the at least one memory and the computer program code are configured to, by the at least one processor, cause the first device at least to:
obtain, from a location management function (LMF) of a communication network, location-related data comprising a cell identity of the source cell, geo-location data of the second device, a velocity of the second device, a moving direction of the second device, and an estimated trajectory of the second device;
determine an ordered list of target cells for a second device to initiate handover to based on the following:
the location-related data of the second device, the second device being served in a source cell of the first device;
coverage information indicating respective coverage areas of the source cell and the target cells as a function of time, and corresponding types of traffic expected by the second device within the target cells; and
satellite ephemeris information associated with a non-terrestrial network device providing the source cell or the target cells, wherein the ordered list identifies at least two adjacent target cells in a chain of conditional handovers to be executed sequentially, and a length of the ordered list is based on a confidence level of the estimated trajectory for the second device;
transmit, to the second device, first information indicating the ordered list of target cells in a radio resource control reconfiguration message that includes full configuration information in a handover command, wherein the first information includes radio configurations associated with each of the target cells in the ordered list;

transmit second information indicating the ordered list of target cells to at least one third device serving the target cells in the ordered list, wherein the second information requests allocation of resources for the handover by the at least one third device, and
transmit handover timing information to the at least one third device, the handover timing information comprising respective time indications of when the second device is expected to be located within the target cells in the ordered list, and wherein random access channel resources are allocated for the third device for an expected time window based on the handover timing information.

2. The first device of claim 1, wherein the causing the second information to be transmitted comprises:
transmitting the second information in a handover request to the at least one third device.

3. The first device of claim 1, wherein the first device and the at least one third device comprises one of the following: at least a part of a terrestrial network device, and at least a part of a non-terrestrial network device, and
wherein the second device comprises one of a terminal device and a relay network device.

4. A second device, comprising:
at least one processor; and
at least one memory including computer program code;
wherein the at least one memory and the computer program code are configured to, by the at least one processor, cause the second device at least to:
receive, from a first device, first information indicating an ordered list of target cells representing a predicted cell-trajectory for the second device, the ordered list enabling the second device to manage a chain of sequential handovers by preparing for a plurality of subsequent handovers in advance, wherein the first information further comprises radio configurations associated with each of the target cells of the ordered list, wherein the ordered list of target cells is based on location-related data of the second device, wherein the second device is served in a source cell of the first device;
determine, from the ordered list, a first target cell is ordered immediately after the source cell;
determine that a first handover condition associated with the first target cell is satisfied;
based on determining that the first handover condition is satisfied, initiate a first handover to the first target cell; and
based on the handover to the first cell being successful:
determine, from the ordered list, a second target cell that is ordered immediately after the first target cell;
determine that a second handover condition associated with the second target cell is satisfied;
based on determining that the second handover condition is satisfied, initiate a subsequent handover from the first target cell to the second target cell;
receive, from a third device, supplementary information comprising further radio configurations associated with a third target cell of the target cells in the ordered list, wherein the further radio configurations are different from the radio configurations in the first information; and
perform a further handover to the third target cell based on the further radio configurations.

5. The second device of claim 4, wherein the second device is further caused to:

receive, from the first device, configuration information to configure:

the first handover condition to be applied by the second device in handover from the source cell to the first target cell, and at least one further handover condition to be applied by the second device in handover between at least one pair of immediately adjacent target cells in the ordered list.

6. A third device, comprising:

at least one processor; and at least one memory including computer program code;

wherein the at least one memory and the computer program code are configured to, by the at least one processor, cause the third device at least to:

receive second information indicating at least a part of an ordered list of target cells for a second device to initiate handover to, the received part of the ordered list indicating at least a first target cell of the third device;

allocate a resource for handover of the second device based on the second information; and perform the handover of the second device from a source cell to the first target cell using the allocated resource;

determine a further ordered list of target cells for the second device to initiate handover in order, the further ordered list being different from the ordered list, wherein the third device is caused to determine the further ordered list by: determining whether the source cell is ordered immediately ahead of the first target cell in the ordered list; and in accordance with a determination that the source cell is not ordered immediately ahead of the first target cell in the ordered list, determine a further ordered list for the second device based on:

location-related data of the second device;

coverage information indicating respective coverage areas of the first target cell and the target cells in the further ordered list as a function of time; and corresponding types of traffic expected by the second device within the target cells in the further ordered list.

7. The third device of claim 6, wherein the third device is further caused to allocate the resource by:

receiving handover timing information comprising respective time indications of when the second device is expected to be located within the target cells in the ordered list; and allocating the resource for the handover based on the handover timing information.

8. The third device of claim 7, wherein the third device is further caused to:

determine further radio configurations associated with at least one of the target cells for the second device to initiate handover to a corresponding target cell in order, the further radio configurations being different from radio configurations configured with the second device; and transmit, to the second device, supplementary information indicating the further radio configurations.

9. The third device of claim 8, wherein the third device is further caused to:

cause deconfiguration information to be transmitted to at least one further third device serving at least one of the target cells that is included in the ordered list but excluded from the further ordered list, the deconfiguration information indicating that the at least one target cell is de-configured for handover of the second device.

* * * * *